United States Patent [19]

Drage et al.

[11] 3,760,363

[45] Sept. 18, 1973

[54] CALCULATING MACHINES WITH A COPY ROUTINE

[75] Inventors: James John Drage; Norbert Kitz, both of The Island, Uxbridge, England

[73] Assignee: Bell Punch Company Limited, London, England

[22] Filed: Oct. 19, 1971

[21] Appl. No.: 190,629

Related U.S. Application Data

[63] Continuation of Ser. No. 844,932, July 25, 1969, abandoned.

[52] U.S. Cl. .............................................. 340/172.5

[51] Int. Cl. .............................................. G06f 7/38

[58] Field of Search ..................... 340/172.5, 173 A, 340/174 SC; 235/156, 180, 165, 168, 92 DP, 92 GT, 92 SH

[56] References Cited

UNITED STATES PATENTS

| | | | |
|---|---|---|---|
| 3,018,955 | 1/1962 | Mendelson | 235/165 |
| 3,053,499 | 9/1962 | Hoberg et al. | 340/172.5 X |
| 3,077,581 | 1/1963 | Grady | 340/173 RC |
| 3,281,794 | 10/1966 | Townsend | 340/172.5 |
| 3,465,296 | 9/1969 | Drage et al. | 340/172.5 |
| 3,523,284 | 8/1970 | Washizuka et al. | 340/173 RC |
| 3,531,632 | 9/1970 | Herr | 235/176 |
| 3,641,501 | 2/1972 | Lloyd | 340/172.5 |

*Primary Examiner*—Harvey E. Springborn
*Attorney*—Laurence R. Brown

[57] ABSTRACT

An electronic calculating machine with a plurality of number registers is disclosed wherein trains of ten pulses are gated to read out the registers at zero including a function control switch for copying numbers from one register into another.

6 Claims, 18 Drawing Figures

INVENTORS
Norbert Kitz
James J. Drage
By Laurence K. Brown
Attorney

CALCULATING MACHINES WITH A COPY ROUTINE

This is a continuation, of application Ser. No. 844,932, filed July 25, 1969.

This invention has reference to calculating machines and has particular reference to calculating machines having at least two registers. Such a register comprises a plurality of register stages, each register stage serving to store a digit number representative of the train of digit pulses applied to it.

It is an object of the present invention to provide an improved system embodying certain circuits whereby a number in one register can be transferred to another register and vice versa.

It is another object of the present invention to provide a calculating machine having circuits whereby a number in one register can be copied into another register.

According to one aspect of the present invention there is provided a calculating machine having a circuit system for transferring a number stored in a first register into a second register, which circuit system comprises a pulse generator for supplying trains of ten pulses into the respective stages of the first and second register through respective gates, the gates of the register having outputs which are energized as a digit stored in the register stage becomes zero, which said energisable outputs control gates to the input of the stages of the other register to allow or prevent passage of pulses of a train of ten pulses to pass into the other register on receipt of a pulse from an energised output, and wherein the gates are also controlled by a function control operated under the control of a function switch on the calculating machine.

According to another aspect of the invention there is provided a calculating machine including a first register and a second register, the registers having a plurality of digit stages, a means for storing a digit, a first means for entering a digit representative of the digit stored in a stage of the first register into the storage means, a second means for entering into the cleared stage of the second register a digit representative of the digit stored in the storage means, and a control means for controlling the operation of the first entering means, the storage means and the second entering means; whereby, when the control means is operated, a representative digit is entered into the storage means from a stage of the first register to the storage means and a digit representative of the digit stored in the storage means is then entered into a stage of the second register.

A constructional embodiment made in accordance with the invention will now be described, by way of example with reference to the accompanying drawings wherein.

Figure 1:
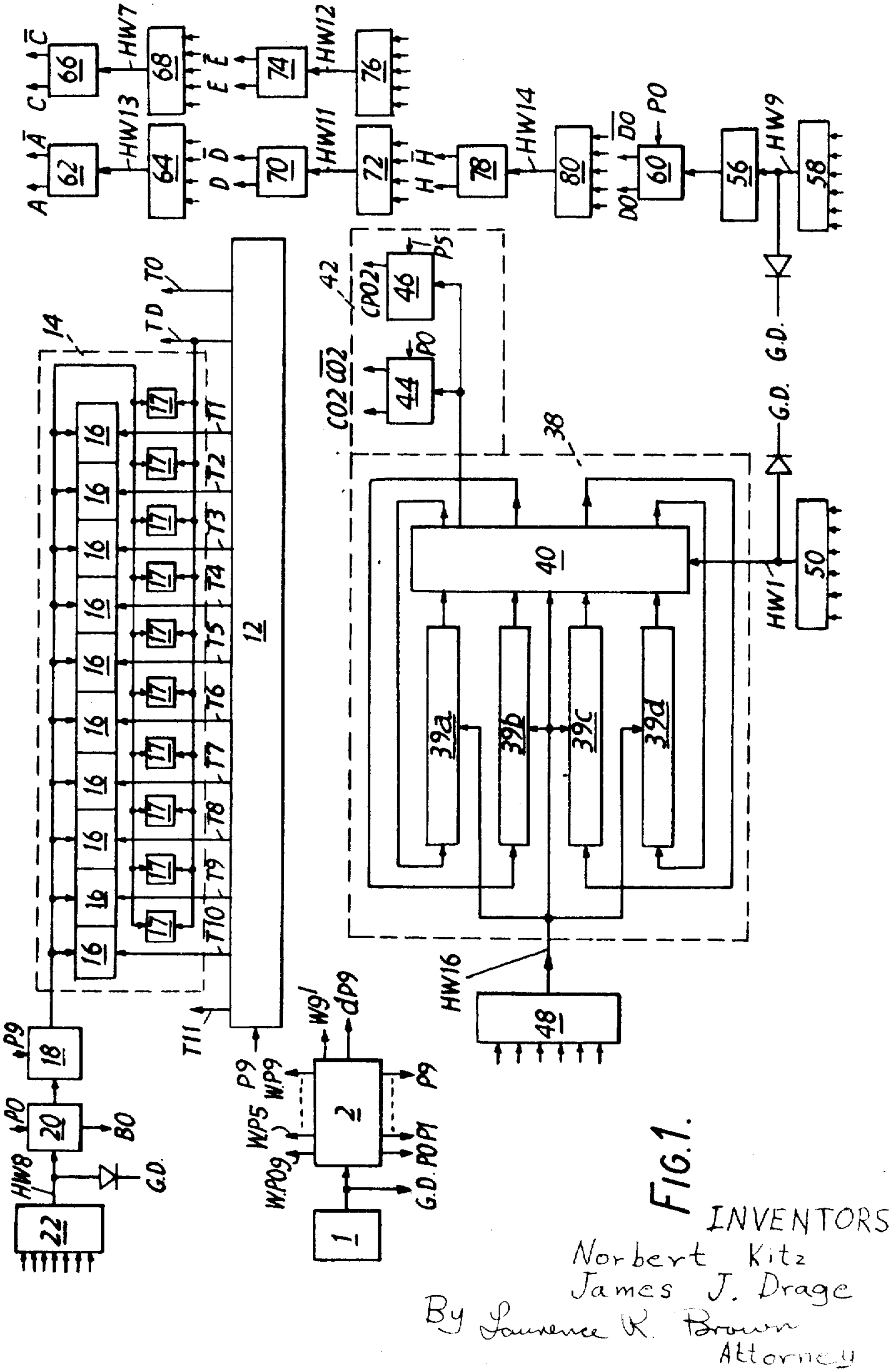
FIG.1 shows a block diagram of part of an electronic calculating machine made according to the invention.

The FIG.1 shows an electronic calculating machine made according to the present invention. In FIG. 1 a master oscillator 1 generates free-running oscillator pulses GD which are 'on' at +12V and 'off' at OV. The oscillator 1 is connected to an input decade 2 which is connected as a Johnson ring circuit. The input decade 2 divides the master oscillator pulses GD into sequential groups of 10 pulses, viz. P0, P1, P2, P3, P4, P5, P6, P7, P8 and P9.

The output pulses P0 to P9 from the input decade 2 are internally gated to give waveforms P0, P5 and P9, a waveform $9^1$, and a waveform *d*P9.

"Waveform P0" is up (at +12 volt) from the back edge of the P9 pulse to the back edge of the P0 pulse. "Waveform P5" is up from the back edge of P4 pulses to the back edge of P5 pulse.

"Waveform P9" is up from the back edge of P8 pulse to the back edge of P9 pulse.

"Waveform $9^1$" is up from the back edge of P0 pulse to the back edge of P9 pulse.

"Waveform dP9" is up from the back edge of P9 pulse to the front edge of P0 pulse.

The calculating machine has a digit keyboard 5 having 10 normally-open digit key switches (not shown) representing the digits 0 – 9 respectively, which switches are closed when the corresponding keys (not shown) are d depressed. The normally-open contact of the digit key switches (not shown) representing the digits 0 – 9 respectively are connected to the pulses P9 to P0 respectively and the connections to the movable contact of the digit key switches are connected to a gate circuit 7 which has an output to a highway HW2. When a digit key (not shown) is depressed to close the corresponding digit key switch, a train of pulses of number equal to the digit corresponding to the digit key depressed, is repetitively transmitted along the highway HW2 until the depressed digit key is released.

The calculating machine also has a function keyboard 8 which has function key switches (not shown) marked with the following symbols "+," "–," "÷," and the key switches 8*a*, 8*b* and 8*c* which are marked "decimal point," "constant," and "enter" respectively. The function key switches (not shown) marked "+," "–," "×," and "÷," which control the arithmetical functions of addition, subtraction, multiplication and division respectively, are similar to the digit key switches and are connected in a similar way to a gate circuit 9. The output from the gate circuit 9 is connected to a highway HW3. The key switches 8*a*, 8*b* and 8*c* are normally open and are connected to a source of positive potential so that when the key is depressed a signal is transmitted along the corresponding line. When a function key is closed by drepssion of the function key, the corresponding function signal is transmitted along the highway HW3. The four function signals transmitted along highway HW3 are :

on depression of the "+" key, up at the back edge of P7, down at the back edge of P0;

on depression of the "−" key, up at the back edge of P7, down at the back edge of P0;

on depression of the "×" key, up at the back edge of P3, down at the back edge of P0;

on depression of the "÷" key, up at the back edge of P5, down at the back edge of P0.

The entry key transmits a "CE" signal along the line C.E., when the entry key is depressed. The decimal point key transmits a "DP" signal along the line D.P., when the decimal point key is depresed; and the constant transmits a constant signal "II" along the line "II," when the constant key is depressed.

A function counter circuit 10, which is a decade counter internally inter-connected to have eight count stages, has seven of the outputs labelled in order of ascending count state the function positions F0, F1, F2, F3, F4, F5, F6, F7 respectively. The eighth count output, which is labelled the function position dF0, comes up at the back edge of the function position, F0 and goes down approximately 0.5 m Sec. later. The input of the function counter circuit 10 is connected by a highway HW4 to a set of gates 11. The function counter outputs or function positions are connected to, and control the operation of, logic gates as hereinafter described. The function counter circuit 10 waits at F0 and, when a function key is operated, the function counter circuit is driven by the pulses transmitted along highway HW4 to the corresponding function position which activates those logic gates which are used to perform the corresponding function. When the function is completed, a stop gate (not shown) drives output of the function counter circuit 10 back to F0. The functions controlled by the function positions are :

| | | | |
|---|---|---|---|
| F0 | display or wait | F4 | subtract |
| F1 | clear | F5 | divide |
| F2 | index | F6 | spare |
| F3 | add | F7 | multiply |

A timer circuit 12, which is a seven-position Johnson ring circuit is internally inter-connected to have 13 count stages which are labelled in order of ascending count states T0, TD, T1, T2, T3, T4, T5, T6, T7, T8, T9, T10, T11. The timer circuit 12 is driven continuously by P9 pulses from the input decade 2 so that the count state outputs are sequentially and continuously generated and each count state output lasts from the back of the P9 pulse to the back edge of the next P9 pulse.

A visual display 14 includes 10 number tube circuits each having a number tube 16 and 10 decimal point neon bulbs 17. The anodes of the number tubes 16 are connected in sequence to a positive potential under the control of the outputs T11 to T2 respectively of the timer circuit 12. The highest significant digit in a displayed number is positioned in the left hand number tube, which is controlled by the output T10, by means of circuits hereinafter described.

One connection to each of the neon bulbs 17 is connected together and these are connected to the output T1 of the timer circuit 12. The cathodes of the 10 number tubes 16 which are shaped to the same digit are connected together. The other connection of the neon bulb 17 at the left hand side of FIG. 1 is connected to the bunched cathode connections showing the digit zero; the other connection of the next neon bulb being connected to the bunched cathode connections showing the digit one; and so on until the other connection of the tenth neon bulb 17 is connected to the bunched cathode connections showing the digit nine.

Figure 5:
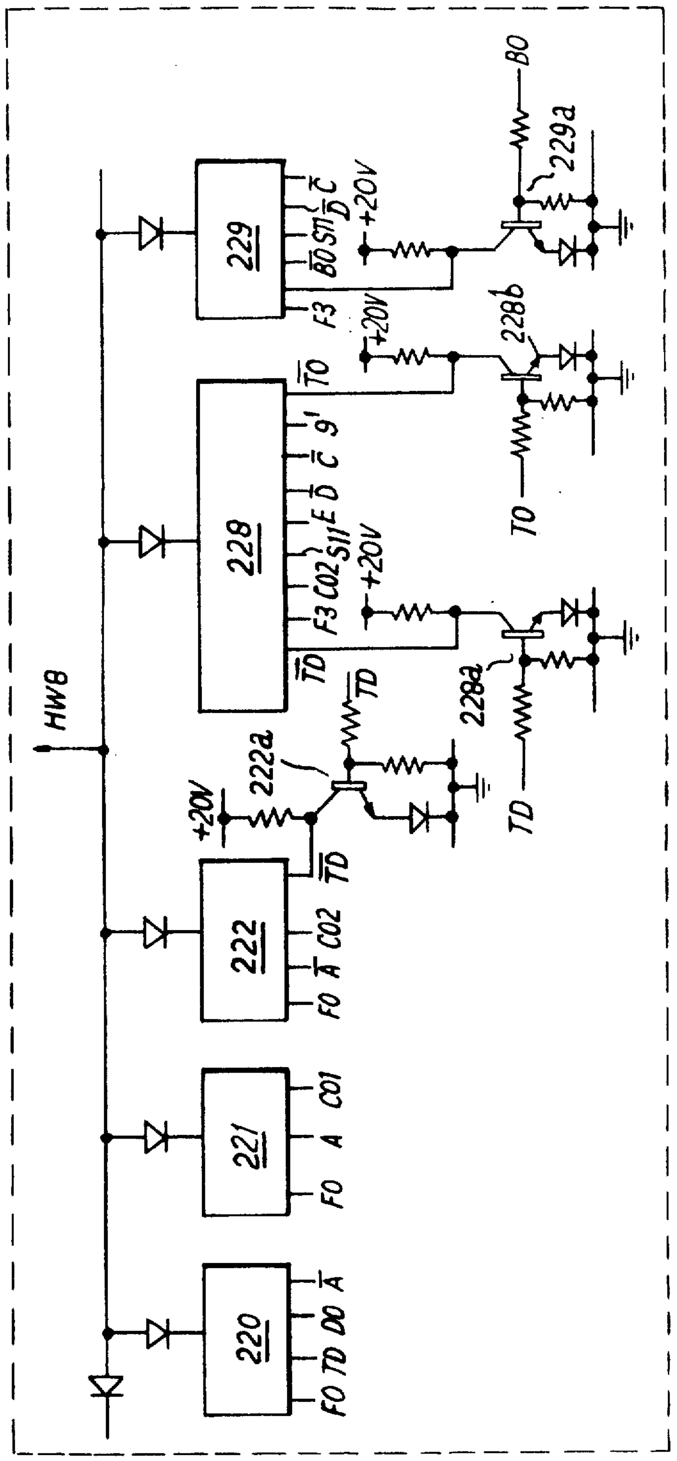
FIG.5 shows part of the set of gates 22 shown in FIG.1 in greater detail.

The 10 bunched cathode connections are connected to the outputs of a row of bistables which forms a staticiser 18. The inputs of the staticiser 18 are connected to the outputs of a storage means in the form of a buffer decade counter 20 which is internally inter-connected so as to convert a train of pulses into the binary-coded decimal equivalent which appears, on the outputs of the decade counter. The input of the buffer 20 is connected by a highway HW8 to the output of a third set of gates 22, part of which is shown in FIG.5. The contents of the buffer 20 is cleared from the buffer 20 into the staticiser 18 at the front edge of each Po pulse and the staticiser 18 is cleared, i.e., the digit zero line is energized, at the back edge of each P9 pulse. The buffer 20 has an output B0 which is energised, i.e., goes to a positive potential, when the buffer 20 stores a digit zero, so that the number cleared from the buffer 20 stays in the staticiser 18 for nearly the duration of an output from the timer circuit 12. The buffer output B0 is connected to the inventor circuits **229*a* (FIG.5) 513*a* (FIG.6) and 369*a*** (FIG.7) so that an inverted buffer output $\overline{B0}$ is produced.

The number tube 16 connected to the output T2 of the timer circuit 12 displays the units digit, the number tube 16 connected to the output T3 displays the tens digit and so on. The position of the decimal point is given by a train of pulses loaded into the buffer 20 when the output TD of the timer circuit 12 is energised and is entered into the staticiser 18 and is displayed by the neon bulb 17 at the position corresponding to the number of pulses in the train, when the next output T1 of the timer circuit is energised. Similarly, if, for example the digit 4 is to be displayed at the tens position, a train of four pulses is entered into the buffer 20 when the output T2 of the timer circuit is energised and the binary-coded-decimal equivalent of the digit 4 appears on the output of the buffer 20. This binary-coded-decimal output is transferred from the buffer 20 to the staticiser 18 at the pulse P0 and the digit 4 is displayed on that number tube 16 which is switched on when the output T3 of the timer circuit 12 is energised. The digit 4 is cleared from the staticiser 18 when the pulse P9 occurs at the end of the time in which the output T3 is energised. The frequency at which the outputs from the timer circuit 12 are energised are such that the digits appearing on the number tubes 16 and the decimal point appearing on a neon bulb 17 appear to be stationery because of the persistance effect of ocular vision.

Figure 3:
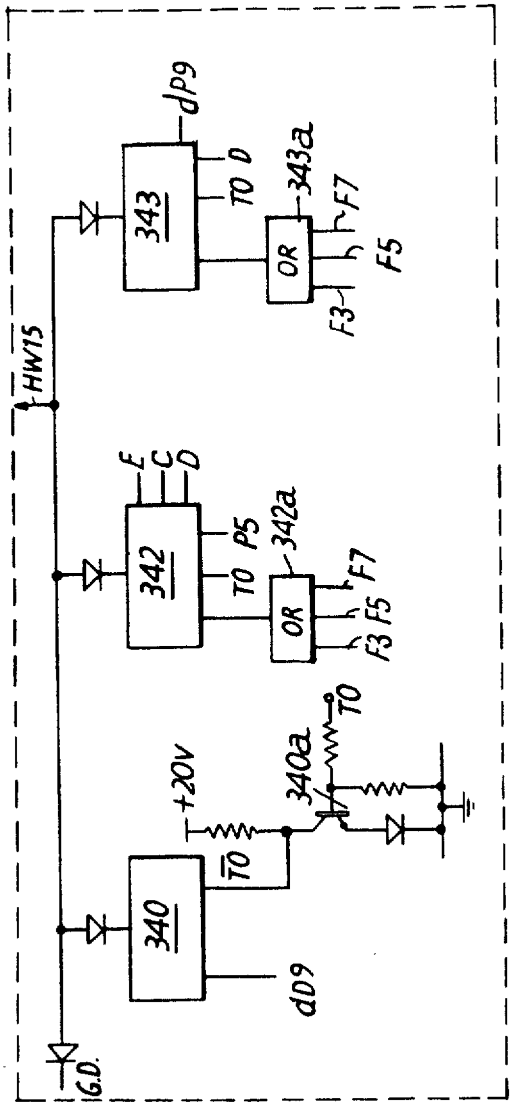
FIG.3 shows part of the set of gates 34 shown in FIG.1 in greater detail.

A second or input register 24 has four shift registers **25*a*, 25*b*, 25*c* and 25*d* each having 12 digit stages. The input and output of the four shift register 25*a*, 25*b* and 25*d* are each connected in a loop with a shift register buffer 26 in the form of four bistable circuits which are internally interconnected to form a decade counter and which act as the thirteenth digit stage. The shift pulse input to four shift registers 25*a*, 25*b*, 25*c* and 25*d* and the shift register buffer 26 are connected by a highway HW 15 to a set of gates 34 part of which is hereinafter described (FIG.3). The set of gates 34 provide shift pulses dP9 to the four shift registers 25*a*, 25*b*, 25*c*** and 25*d* and to the shift register buffer 26 so that the binary-coded-decimal digits in the four shift registers circulate through the shift register buffer 26 and back to the input of the shift registers respectively.

A carry pulse output of a bistable circuit of the shift register buffer 26, which output is energised when the digit in the shift register buffer 26 goes from the count of nine to the count of zero, is connected to the input of a carry store 28. The carry store 28 comprises a first bistable circuit 30 having the outputs C01 and $\overline{C01}$ and a second bistable circuit 32 having the output CP01. The "set" connections from the first bistable circuit 30 and the second bistable circuit 32 respectively are connected to the carry pulse output of the shift register buffer 26. The first bistable circuit 30 is reset by a pulse P0 so that the output C01 is energised i.e., is at a positive potential. A carry pulse from the shift register buffer 26 causes the output C01 to be energised. The second bistable circuit 32 is reset by a pulse P5, so that the output CP01 is not energised until a carry pulse is received from the shift buffers. A fifth set of gates 36, partly hereinafter described (FIG.7), are connected by a highway HW5 to the input of the shift register buffer 26.

Figure 2:
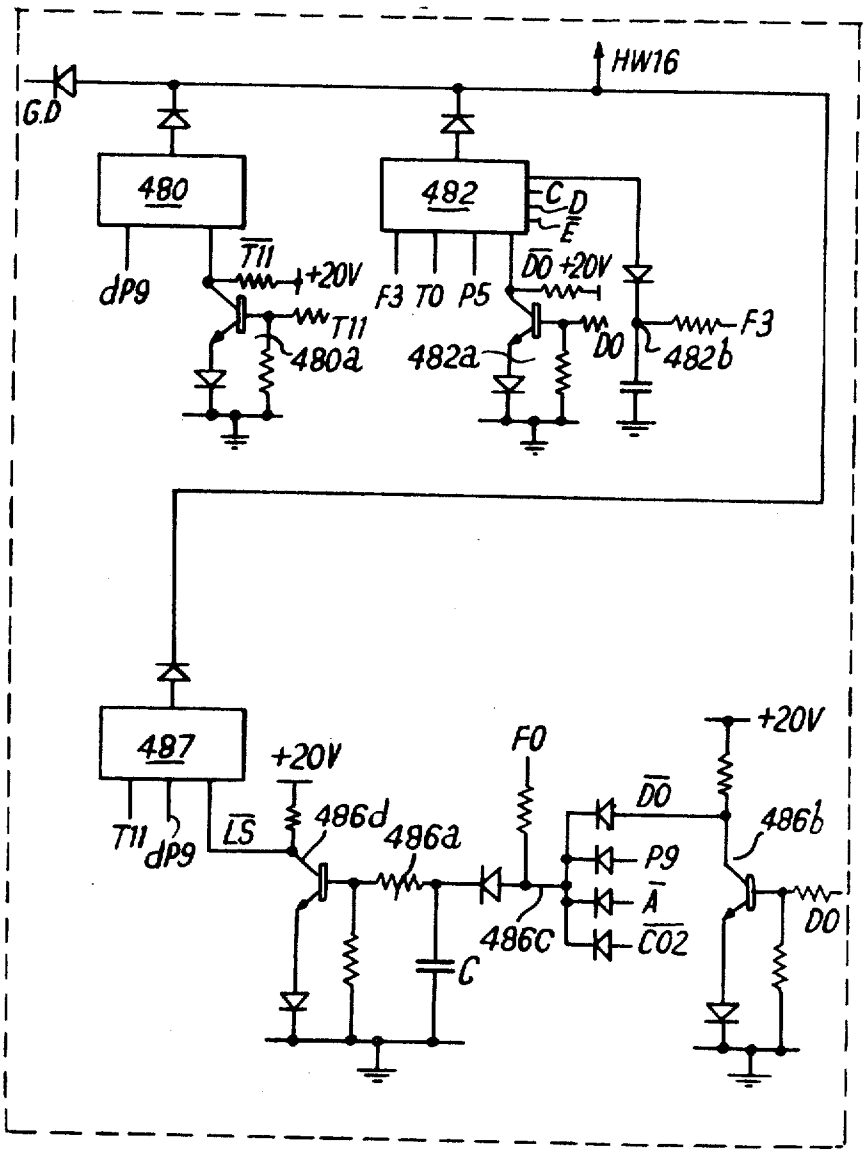
FIG.2 shows part of the set of gates 48 shown in FIG. 1 in greater detail.
Figure 6:
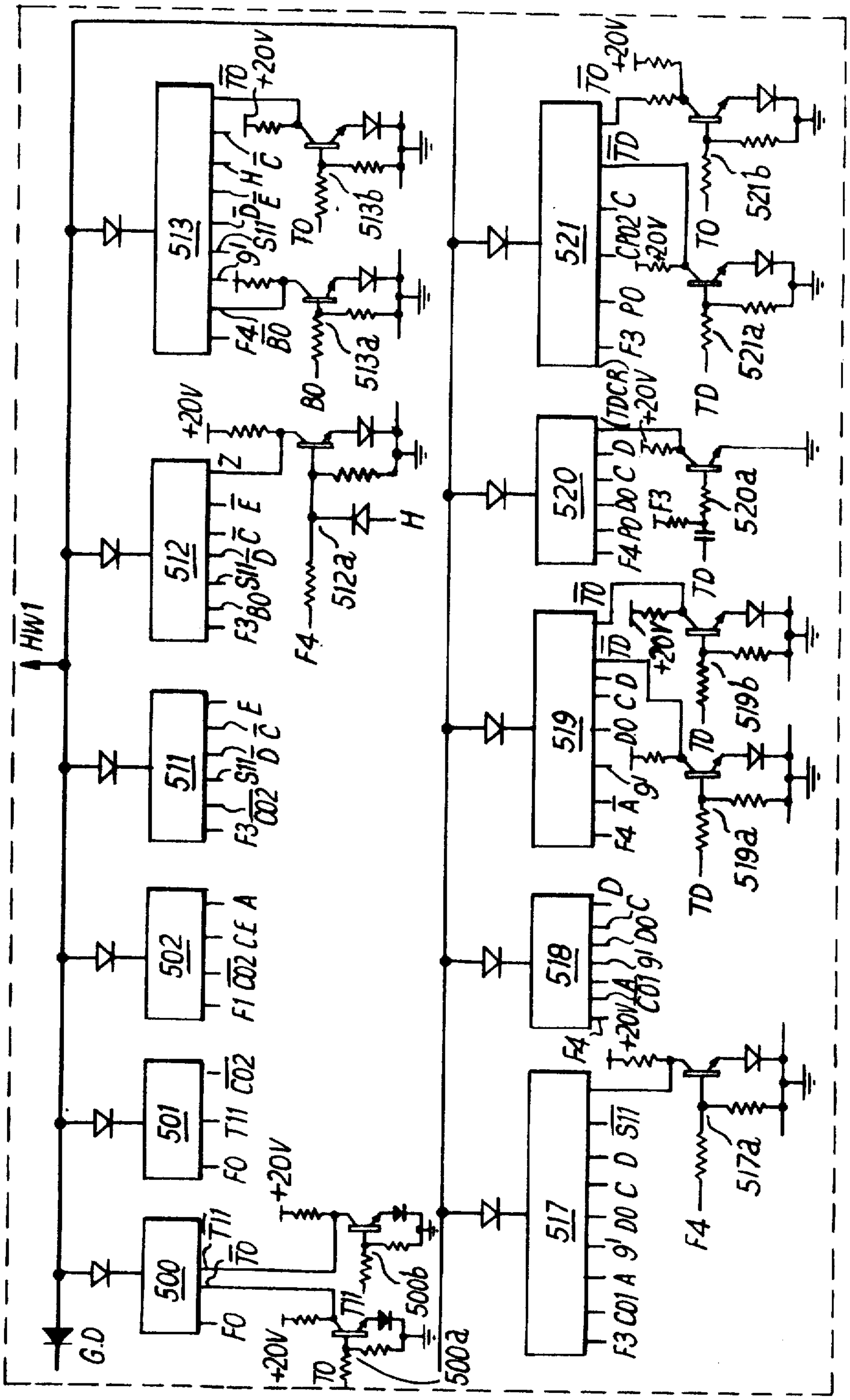
FIG.6 shows part of the set of gates 50 shown in FIG.1 in greater detail.

A first or accumulator register 38 has four 12-stage shift registers **39*a*, 39*b*, 39*c* and 39*d*, a shift register buffer 40 and a carry store 42 as previously described for input register 24. The shift pulse inputs of the four shift register 39*a*, 39*b*, 39*c* and 39*d* and the shift register buffer 40 are connected by a highway HW16 to a set of gates 48 partly hereinafter described (FIG.2). The carry pulse output of the shift register buffer 40 is connected to the set input of the carry store 42 which comprises a first bistable circuit 44 having the outputs C02 and $\overline{C02}$ and a second bistable circuit 46 having an output CP02. The first bistable circuit 44 is reset by a pulse P0 so that the output $\overline{C02}$ is energised and the second bistable circuit is reset by a pulse P5 so that the output CP02 is not energised. The shift register buffer 40 is connected by a highway HW1 to a fourth set of gates 50**, partly hereinafter described (FIG.6).

Thus in the input register 24 and the accumulator register 38 the shift registers and the shift register buffers form thirteen-stage loops around which pulse patterns circulate in synchronism with the energised outputs of the timer circuit 12. If the input register 24 or accumulator register 38 receives thirteen shift pulses, the digit in the units or T1 digit stage of the input register 24 or accumulator register 38 is in the shift register buffer 26 or 40 respectively when the output T1 of the timer circuit 12 is energised. Similarly the tens or T2 digit stage of the input register 24 or accumulator register 38 is in the shift register buffer 26 or 40 respectively when the output of the timer circuit T2 is energised, and so on.

If one shift pulse to a register is supressed, so that the register only receives 12 shift pulses, the number in the register is moved one place to the left with respect to the outputs of the timer circuit 12.

If an extra shift pulse is gated into a register with the pulse P5, the number in the register is moved one place to the right with respect to the outputs of the timer circuit 12.

Figure 11:
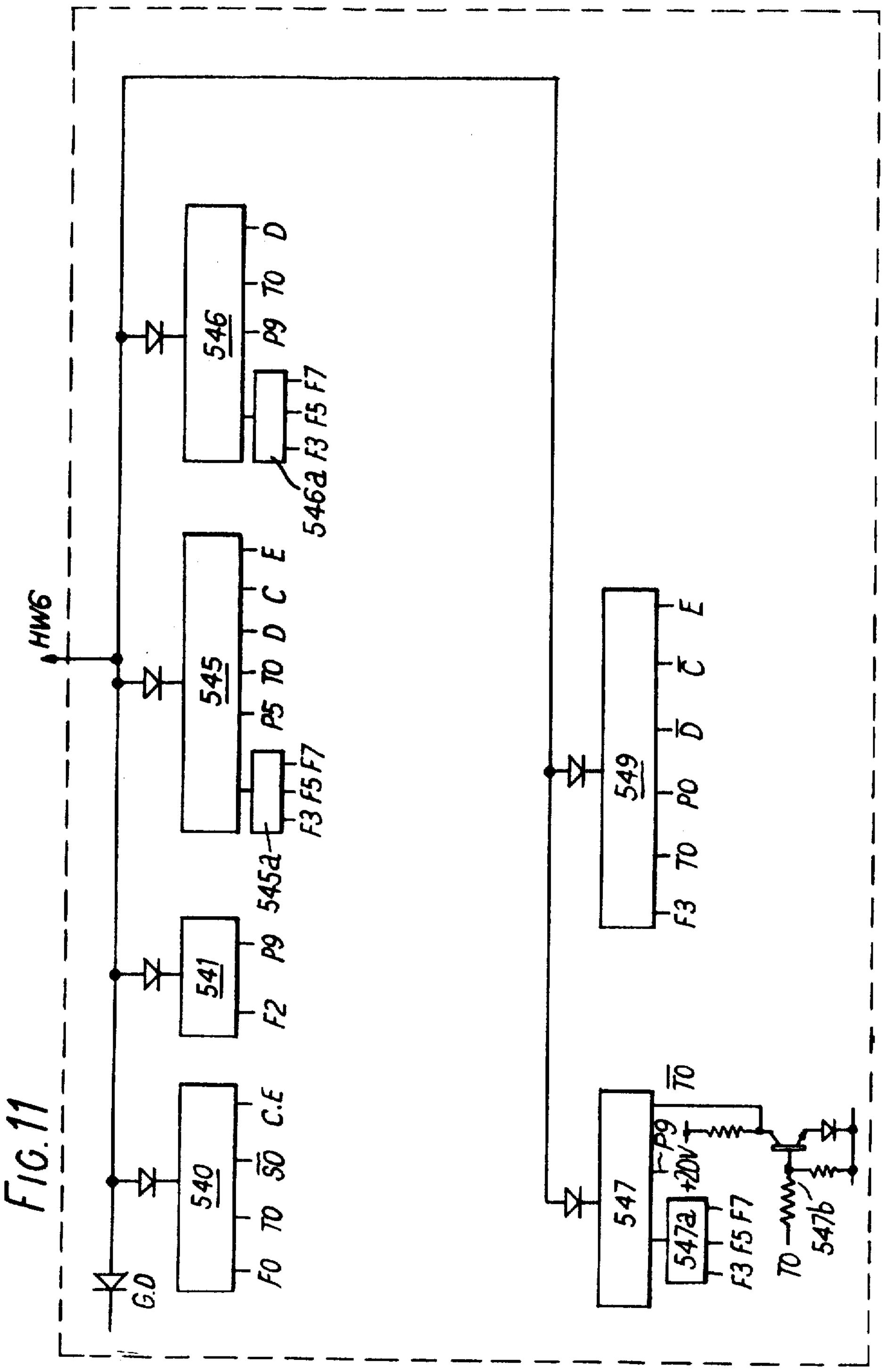
FIG.11 shows part of the set of gates 54 shown in FIG.1 in greater detail.

A slip counter 52, which is a four-bistable ripple-through counter internally inter-connected to have 13 count states which are labelled in ascending order of count state S0, SD, S1. . . .S11 has outputs connected to the S0 and S11 count states. The outputs to the count states S0 and S11 are connected to invertor circuits (not shown) to give the out puts $\overline{S0}$ and $\overline{S11}$ respectively and S0. The outputs S11, $\overline{S11}$ and S0 are used to control logic circuit gates. The input of the slip counter 52 is connected by a highway HW6 to a second set of gates 54. The slip counter 52 is driven by P9 pulses to maintain its energised count states in correspondence with the energised count state outputs of the timer circuit 12. Shift pulses are supressed or extra ones gated in through the set of gates 54 partly shown hereinafter (FIG.11). The main purpose of the slip counter 52 is to keep a record of the amount of slip with respect to the timer circuit 12 which occurs when a number is shifted in the input register 24 or the accumulator register 38.

Figure 4:
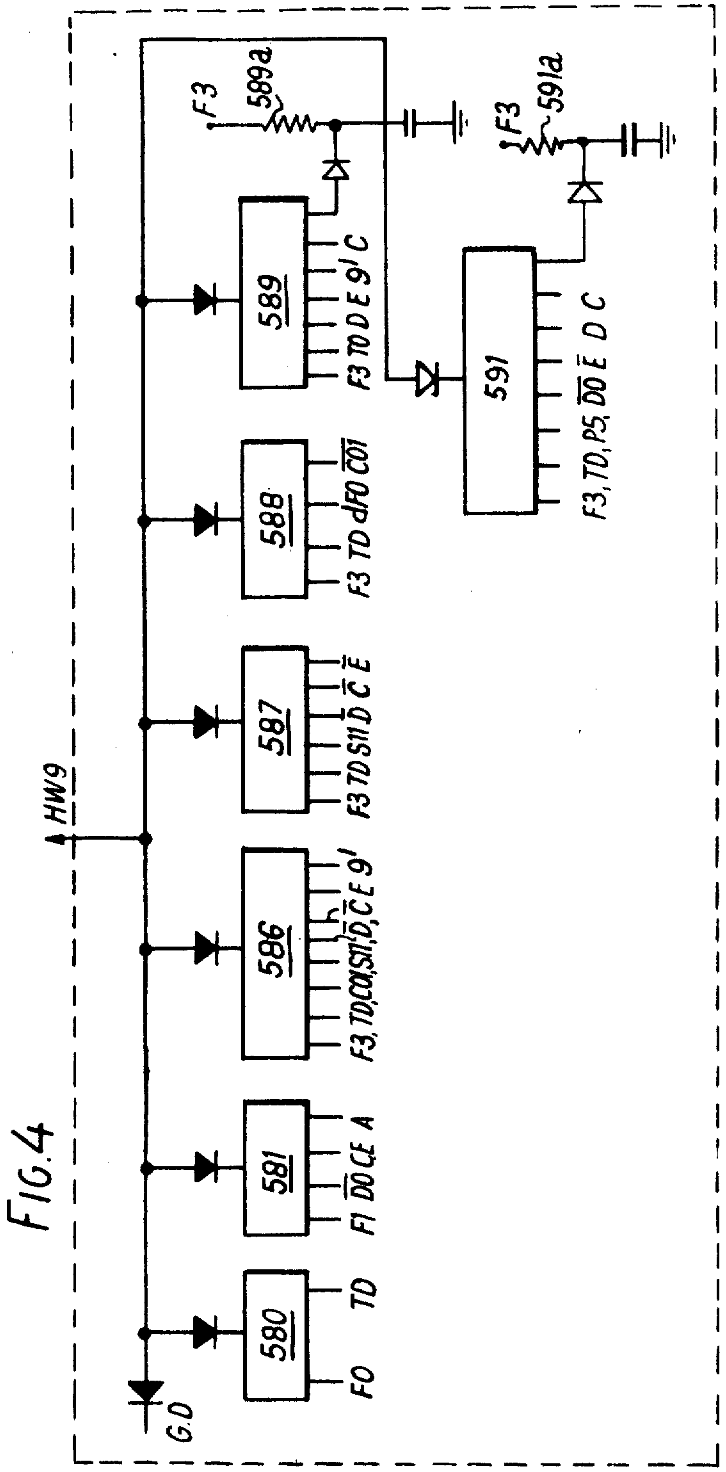
FIG.4 shows part of the set of gates 58 shown in FIG. 1 in greater detail.

A decimal counter 56, which is a four-bistable ripple-through counter internally inter-connected so as to have ten count states, has its output connected to the set input of an output bistable circuit 60. The input of the decimal counter 56 is connected by a highway HW9 to a set of gates 58, partly hereinafter described (FIG.4). The output bistable circuit 60 has the outputs D0 and $\overline{D0}$. The output bistable circuit 60 is arranged so that the output D0 is energised when the count in the decade counter 56 goes to or passes through the zero count state; the output bistable circuit 60 is reset so that the output $\overline{D0}$ is energised by the next P0 pulse.

The decimal counter 56 holds the count corresponding to the position of the decimal point digit of a number stored in the accumulator register 38. This decimal point digit is held separately from the other digits in the accumulator register 38 because the accumulator register is used for calculation of products and quotients and the whole accumulator register 38 is required for holding partial products or partial remainders during the calculation. The decimal point digit is also held separately because the answer in the accumulator register 38 may need to be repositioned so as to display the most significant digit of the answer in the left hand number tube 16 of the visual display 14, and this is more easily done if the decimal point digit is held separately.

Figure 8:
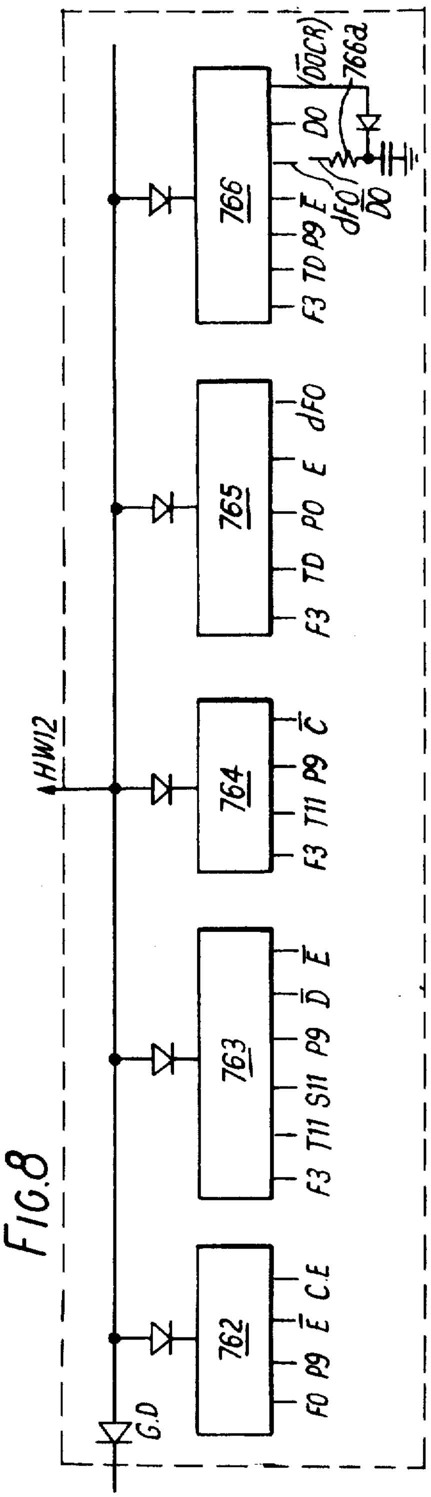
FIG.8 shows part of the set of gates 76 shown in FIG.1 in greater detail.
Figure 9:
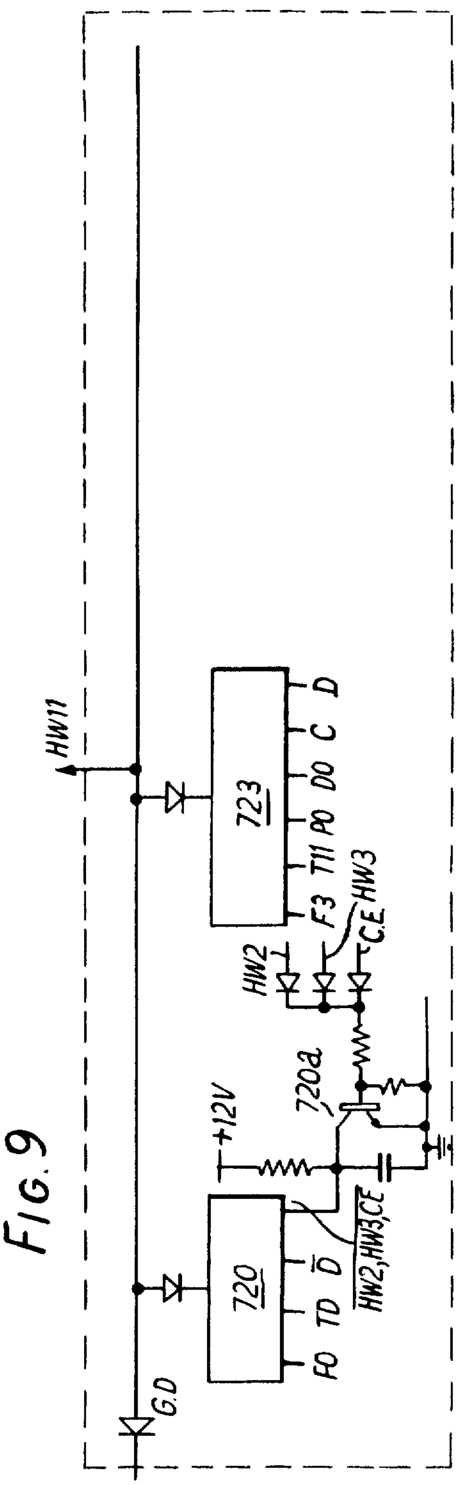
FIG.9 shows part of the set of gates 72 shown in FIG.1 in greater detail.
Figure 13:
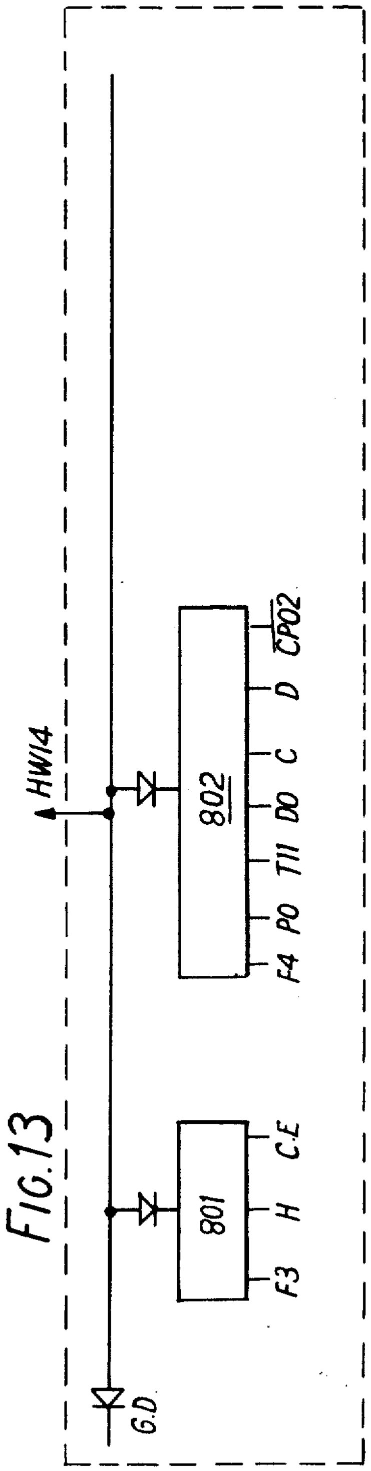
FIG.13 shows part of the set of gates 80 shown in FIG.1 in greater detail.
Figures 14, 14A, 14B, 14C, 14D:
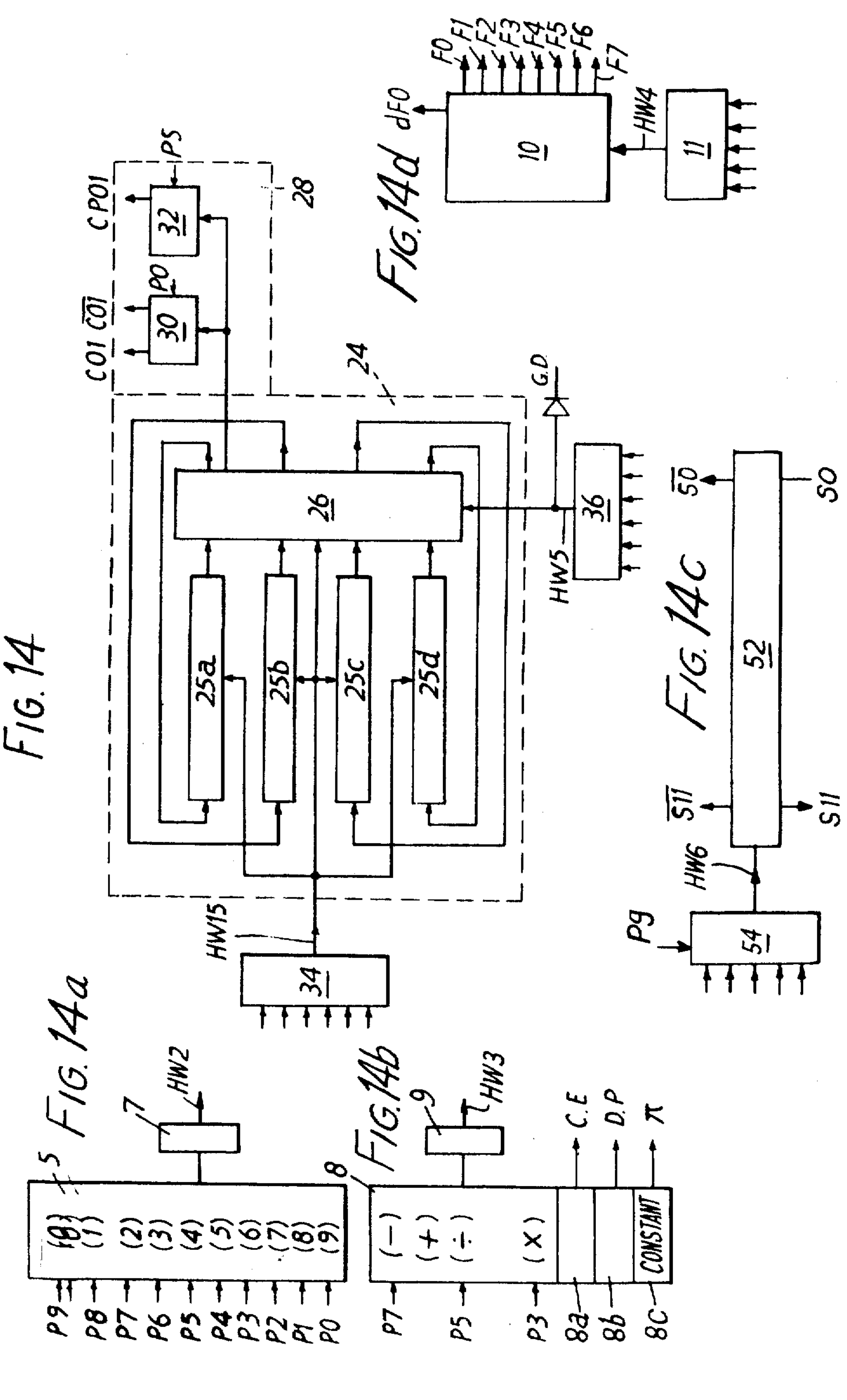

A bistable circuit 62 havint the outputs A and $\overline{A}$ has the input connected by a highway HW13 to a set of gates 64. A bistable circuit 66 having the outputs C and $\overline{C}$ and has the input connected by a highway HW7 to a set of gates 68. A bistable circuit 70 having the outputs D and $\overline{D}$ has the input connected by a highway HW11 to a set of gates 72, partly hereinafter described (FIG.9). A first bistable circuit 74 having the one and other outputs E and $\overline{E}$ respectively, has the input connected by a high-way HW12 to a first set of gates 76, partly hereinafter described (FIG. 8). A bistable circuit 78 having the outputs H and $\overline{H}$ has the input connected by a highway HW14 to a set of gates 80 partly hereinafter described (FIG.13).

The bistable circuit 62 controls which register has its number displayed by the visual display 14. If the bistable circuit 62 is set so that the output A is energised, the number stored in the input register 24 is displayed; if the bistable circuit 62 is set so that the output $\overline{A}$ is energised, the number stored in the accumulator register 38 is displayed.

The second bistable circuit 66 having the outputs C and $\overline{C}$ controls the time at which the input register 24 can shift with respect to the accumulator register 38 so that the four arithmetic functions can be performed by the calculating machine. If the bistable circuit 66 is set so that the output C is energised, shift can take place; if the bistable circuit 6 is reset so that the output $\overline{C}$ is energised the registers are held so that shift cannot take place.

The bistable circuit 70 together with the bistable circuit 66 controls the number of shift pulses sent through the set of gates 34 and 48 to the input register 24 and the accumulator register 38 respectively. The control operation is more fully described hereinafter.

The bistable circuit 74 has a control function as hereinafter described.

The FIGS. 2 to 13 show in greater detail, part of some of the set of gates shown in FIG. 1. Unless otherwise indicated in the description the circuits shown are "and" logic circuit gates.

The FIG. 2 shows in detail part of the set of gates 48 shown in FIG.1. The set of gates 48 includes the "and" gates 480, 482 and 487, a transistor invertor circuit **480*a*, a time delay circuit 482*b*, and a circuit 486*a*. The circuit 486*a* comprises a transistor invertor circuit 486*b* whose input is connected to the output D0 of the output bistable 60 and whose output is connected to an "and"logic gate 486*c*. The output of the "and" gate 486*c* is connected to a capacitor C and to a transistor invertor circuit 486*d*.**

The FIG. 3 shows in detail part of the set of gates 34 shown in FIG. 1. The circuit in the Figure comprise the "and" gates 340, 342 and 343, the "or" gates **342*a* and 343*a* and a transistor invertor circuit 340*a* for the output T0 of the timer circuit 12.**

The FIG. 4 shows in detail part of the set of gates 58 shown in FIG. 1. The circuits in the Figure comprise the "and" gates 580, 581, 586 to 589 and 591, and the time delay circuits **589*a* and 591*a*.**

The FIG. 5 shows in detail part of the third set of gates 22 shown in FIG. 1. The circuits in the Figure comprise the "and" gates 220 to 222 and 228 and 229 and the invertor circuit **222*a*, 228*a*, 228*b* and 229*a*, for the output TD of the timer circuit 12.**

The FIG. 6 shows in details part of the set of gates 50 shown in FIG. 1. The circuits in the Figure comprise the "and" gates 500 to 502, 511 to 513, and 517 to 521, transistor invertor circuits **500*a*, 500*b*, 513*a*, 513*b*, 517*a*, 519*a*, 519*b*, 521*a*, and 521*b*, a transistor invertor "and" gate 512*a*, and a transistor invertor time delay circuit 520*a*.**

Figure 7:
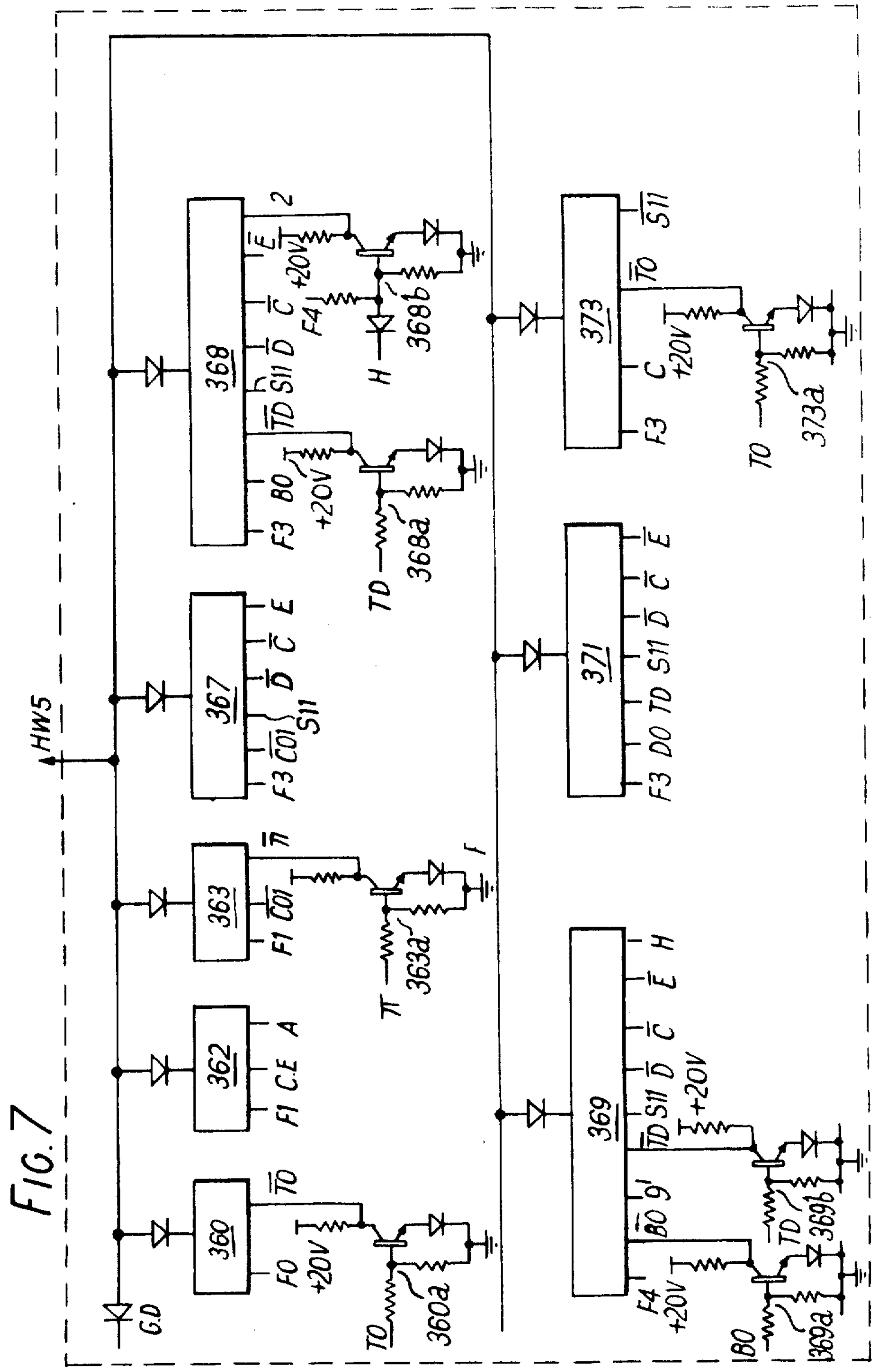
FIG.7 shows part of the set of gates 36 shown in FIG.1 in greater detail.

The FIG. 7 shows in detail part of the set of gates 36 shown in FIG. 1. The circuits in the Figure comprise the "and" gates, 360, 362, 363, 367 to 369, 371 to 373, the transistor invertor circuits **360*a*, 363*a*, 368*a*, 369*a*, 369*b* and 373*a* and a transistor invertor "and" gate 368*b*.**

The FIG. 8 shows in detail part of the set of gates 76 shown in FIG. 1. The circuit shown in the Figure comprises the "and" gates 762 to 766 and a time delay circuit **766*a*.**

The FIG. 9 shows in detail part of the set of gates 72 shown in FIG. 1. The circuits shown in the Figure comprise the "and" gates 720 and 723 and a transistor invertor 'or' gate circuit **720*a*.**

Figure 10:
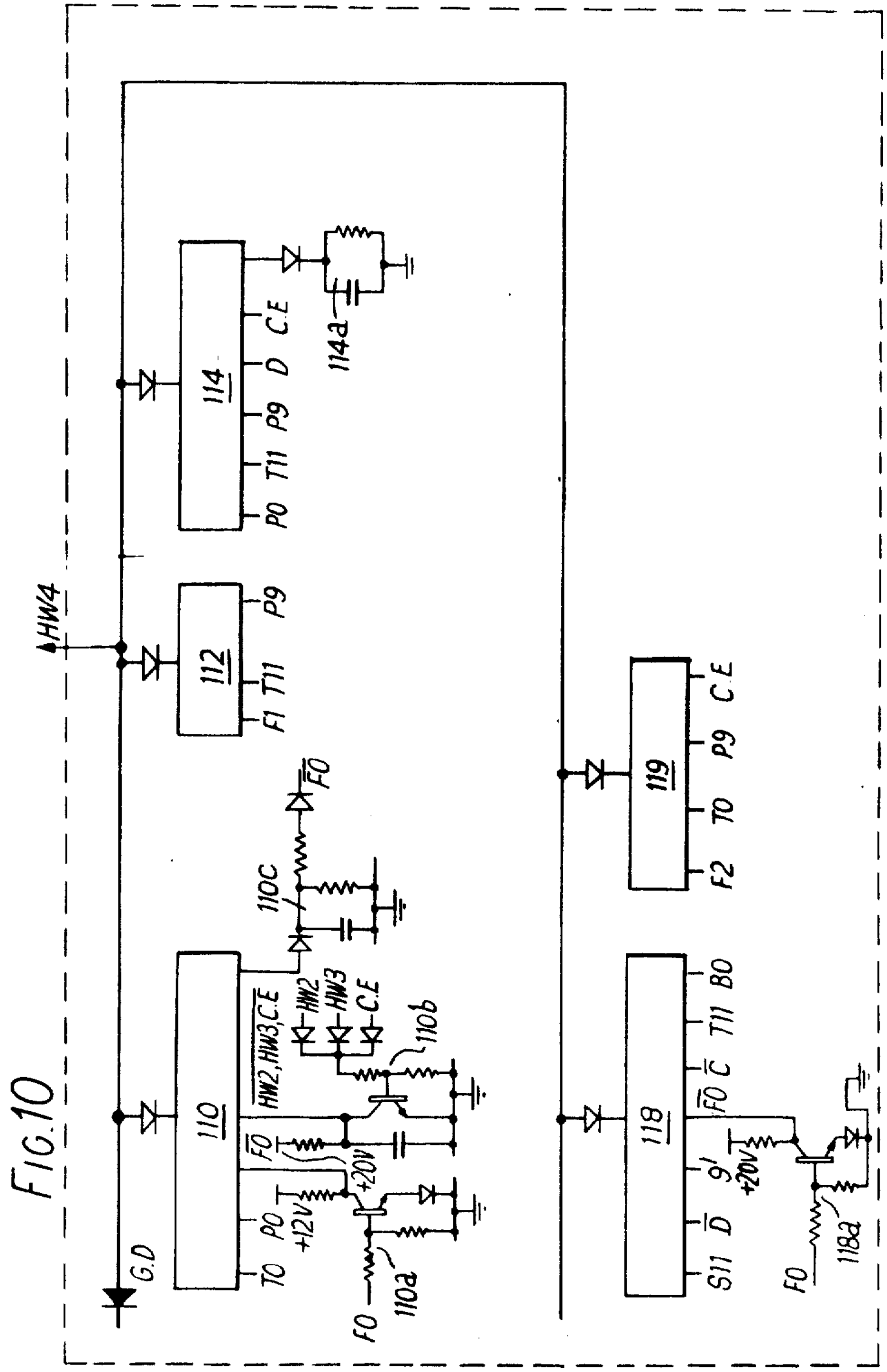
FIG.10 shows part of the set of gates 11 shown in FIG. 1 in greater detail.

The FIG. 10 shows in detail part of the set of gates 11 shown in FIG. 1. The circuit shown in the Figure comprises the 'and' gates 110, 112, 114, 118 and 119, the transistor invertor circuit **110*a* and 118*a* a tansistor invertor and 'or' gates 110*b*, a one-quarter-second time delay circuit 110*c* and a 10-millisecond time delay circuit 114*a*.**

The FIG. 11 shows in detail part of the set of gates 54 shown in FIG. 1. The circuit shown in the Figure comprises the 'and' gates 540, 541, 545 to 547 and 549, the 'or' gates **545*a*, 546*a* and 547*a* and a transistor invertor circuit 547*b*.**

Figure 12:
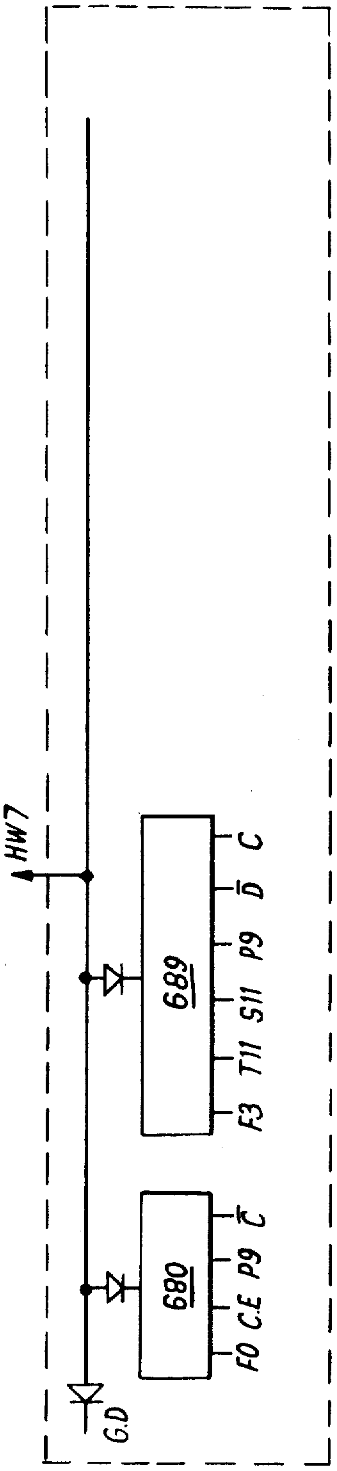
FIG.12 shows part of the set of gates 68 shown in FIG.1 in greater detail.

The FIG. 12 shows in detail part of the set of gates 68 shown in FIG. 1. The circuit shown in the Figure comprises the 'and' gates 680 to 689.

The FIG. 13 shows in detail part of the set of gates 80 shown in FIG. 1. The circuit shown in the Figure comprises the 'and' gates 801 and 802.

The gate 480 (FIG. 2) supplies 12 shift pulses *dp*9 and the gate 486 supplies the thirteenth shift pulse if the input $\overline{LS}$ is energised, so that the shift pulses to the accumulator register 38 and the outputs of the timer circuit 12 occur in synchronism.

The calculating machine has other circuitry (not shown) which is interconnected with the parts of the calculating machine shown in the Figures so that numbers can be entered into the input register 24 and accumulator register 38 through the digit keyboard 5, which numbers are used to perform arithmetic calculations selected from those on the function keyboard 8.

The answer to a calculation is stored in and circulates around the accumulator register 38 and is displayed when the inputs marked FO on gates are energised. A digit is shifted into the shift register buffer 40 of the accumulator register 38 by a dep9 pulse which occurs at the same time as the next output of the timer circuit 12 is energised. The gate 500 (FIG. 6) is energised for the outputs T1, TD and T2 to T10 of the timer circuit 12 and allows ten oscillator GD pulses (corresponding to the pulses P0 to P9) to circulate the digit in the shift register buffer 40. At the same time the gate 222 FIG. 5 is shut (since the first bistable circuit 44 was reset by the first pulse P0) and does not allow oscillator GD pulses to pass into the buffer 20. When the digit in the shift register buffer 40 goes through zero, a pulse is passed to the first bistable circuit 44 and the second bistable 46 so that the outputs C02 and CP02 are energised. When the input C02 is energised, the gate 222 allows a number of oscillator pulses GD, which are equal to the digit in the shift register buffer 40, to enter the buffer 20. As previously described, the digit in the buffer 20 is cleared into the staticiser 18 at the next PO pulse (which also resets the first bistable circuit 44) and the digit is displayed on the visual display 14.

An outline of the various sequences of internal operations initiated when the 'clear' key is depressed at various stages during the operation of the calculating machine will now be given. A detailed description of these various sequences of internal operations will be given later.

The 'clear' can be depressed at three places during the operation of the calculating machine. These places are: (a) immediately after switch-on of the calculating machine, (b) after entry of a number into the calculating machine and (c) after the operation of a function key.

The effect of depressing the 'clear' key immediately after switch-on is to initiate a programme which sets certain counter circuits and bistable circuits to initial conditions and also initiates a programme in which the number in the accumulator register 38 is cleared while the number in the input register 24 is not cleared but is circulated. The number in the input register 24 is then added to the cleared accumulator register 38 by an addition routine. The number in the accumulator register 38 is then copied back into the input register 24 by a copy routine so that the number originally in the input register 24 ends up in the input register 24 and the accumulator register 38.

The addition routine beginds with a sub-routine which a comprises the subtraction of the decimal point count of the input register 24 from the decimal point count of the accumulator register 38 and then a relative shift between the input register and the accumulator register by a number of stage positions equal to the difference between the decimal point counts. The addition sub-routine then follows with the answer stored in the accumulator register. The answer in the accumulator register 38 may be shifted within this register by circuits not described, so that the highest significant digit is displayed in the number tube 16 of the visual display 14 which is energised by the output T10 of the timer circuit 12.

The copy routine, which follows the addition routine, comprises a two-stage routine which is continuously repeated. When the copy routine is initiated, the first stage beginds with the most significant digit of the number in the accumulator register 38 being transfered to the buffer 20. During the first stage the highest significant digit stages of the input register 24 and the accumulator register 38 are cleared. During the second stage the highest significant digit stored in the buffer 20 is transferred into the cleared highest significant digit stages of the input register 24 and the accumulator register 38. This two-stages sequence is repeated digit-by-digit until the number remaining in the accumulator register 38 after the addition routine has been copied into both the input register 24 and the accumulator register 38.

The effect of depressing the 'clear' key after the entry of a number into the calculating machine is to cause the number which is entered in the input register 24 to be added into the cleared accumulator register 38 and then copied into the input register 24 and the accumulator register 38. The addition and copy routines are identical to those previously described.

The effect of depressing the 'clear' key after the depression of the function key is to cause the zeros of the cleared input register 29 to be added to the number in the accumulator register 38. The unchanged number in the accumulator register 38 is then copied into the input register 24 and accumulator register 38. The addition and copy routines are identical to those previously described.

A detailed description of the operations previously outlines will now be given.

In the description, the stage of the input register 24 or the accumulator register 38 from which a digit is taken and loaded into the buffer 20 when an output of the timer circuit 12 is energised is for convenience labelled with that timer circuit output. For example, the digit stage of the input register 24 from which is taken the digit which is loaded into the buffer 20 when the timer circuit output TD is energised is called the TD stage of the input register 24. Also, in the description, a timing period means the time taken for the outputs TO, TD to T11 inclusive of the timer circuit 12 to be energised in sequence.

The calculating machine operates as follows :

When the calculating machine is switched on the gate 110 clears the function counter circuit 10 to the output F0 after a delay of one-quarter of a second. At the end of this delay, other gates having the function counter output F0 as an input are in the 'enabled' state. The gate 720 resets the bistable circuit 70 to energise the output D. The gate 500 circulates the number in the accumulator register 38 and the gate 501 clears the T11 stage of the accumulator register 38. The gate 580 circulates the decimal count stored in the decimal counter 56, when the output TD of the timer circuit 12 is energised. The gate 360 circulates the number in the input register 24. The gate 221 loads the buffer circuit 20 to display input register 24 or the gates 220 and 222 load the buffer circuit 20 to display the number stored in the accumulator register 38. The gate 501 clears the digit stage of the accumulator register 38 which is enabled by the energised T11 output of the timer circuit 12.

If the 'enter' key on the function keyboard 8 is depressed immediately after switch-on the depression of the 'enter' key causes the 'clear and enter' signal C.E. to be energised, i.e., to go from 0 volts to +12 volts. The gate 540 clears the slip counter 52 so that the count state SO is energised. The gate 680 sets the bistable circuit 66 to energise the output C.

The gate 762 energises the output E of the bistable circuit 74 if the output $\bar{E}$ was previously energised. The gate 114 pulses the function counter 10 so that the couput F1 is energised. The gate 362 circulates the number stored in the input register 24, if the output A of the bistable circuit 62 is energised, and over-rides the gate 363 which would otherwise clear the input register 24. The gate 502 clears the number in the accumulator register 38 and the gate 581 clears the accumulator decimal point count from the decimal counter 56. The gate 112 pulses the function counter 10 so that the output F2 is energised. The gate 541 causes the output of the slip counter 52 to move directly from S0 to S11. The gate 119 pulses the function counter 10 so that the output F3 is energised and the addition routine is initiated. The gate 801 ensures that the output $\bar{H}$ of the bistable circuit 78 is energised.

The addition routine begins with the following outputs energised: bistable circuits outputs A or $\bar{A}$, C, D, E and $\bar{H}$; slip counter output S11; function counter output F3; timer circuit output T0 and input decade output P0.

The first sub-routine of the addition routine is to align the numbers in input register 24 and the accumulator register 38 so that, in effect, the decimal point counts are the same. This alignment is done by subtracting the input register decimal point count from the accumulator register decimal point count stored in the decimal counter 56 by means of the gate 588. At the end of the subtraction sub-routine, the output of the bistable circuit 60 which is energised depends on which register originally had the greater decimal point count. If the decimal point count of the assumulator register is greater than the decimal point counter of the input register (Case 1), the energised output of the output bistable circuit 60 is changed from the output $\overline{D0}$ to the output D0 and a pluse count which is equal to the difference between the decimal points is stored in the decimal counter 56. If the decimal point count of the input register 24 is greater than the decimal point count of the accumulator register 38 (case 2), the energised output of the output bistable circuit 60 remains unchanged to $\overline{D0}$ and a count equal to the tens complement of the difference between the decimal points is stored in the decimal counter 56.

When the accumulator register decimal point count is greater than the input register decimal point count (case 1), each time the output TD of the time circuit 12 is energised the gate 765 sets the bistable circuit 74 so that the output $\overline{E}$ is energised and; because in this condition the output D0 is energised, the gate 766 resets the bistable circuit 74 so that the output E is energised. When the next timer output, the output T1, of the timer circuit 12 is energised, the pulse P0 sets the output bistable circuit 60 so that the output $\overline{D0}$ is energised. During the next timing period of the timer circuit 12, during which the outputs T0 to T11 are sequentially energised, the gates 480 and 487 pass thirteen shift pulses to the accumulator register 38 while the gates 340, 342 and 343 and the gates 545, 546, and 547 pass fourteen shift pulses to the input register 24 and the slip counter 52 respectively so that the input register 24 moves one digit stage with respect to the accumulator register 38. During this timing period of the timer circuit 12 the gate 589 causes the nine pulses of the output $9^1$ from the input decade 2 to circulate and reduce by one the count in the decimal counter 56. The timing periods of the timer circuit 12 and the operation of the gates previously described are repeated until the difference count in the decimal counter 56 is zero so that the output D0 of the output bistable circuit 60 remains energised after the application of the reset pulse P0 occurring when the timer output T1 is energised. The second sub-routine of the addition routine, the addition of the number in the input register 24 to the number in the accumulator register 38, follows and is described later.

When the input register decimal point count is greater than the accumulator register decimal point count (case 2), each time the output TD of the timer circuit 12 is energised the gate 765 sets the bistable circuit 74 so that the output $\overline{E}$ is energised. During the next timing period of the timer circuit 12, during which the outputs T0 to T11 are sequentially energised, the gates 340 and 343 and the gates 546 and 547 pass thirteen shift pulses to the input register 24 and the slip counter 52 respectively and the gates 480, 482 and 487 pass fourteen shift pulses to accumulator register 38 so that the accumulator register 38 moves one digit stage with respect to the input register 24. During this timing period of the timer circuit 12 the gate 591 causes a pluse to increase by one the count in the decimal counter 56. The timing periods of the timer circuit 12 and the operation of the gates previously described are repeated until the count in the decimal counter 56 is zero so that the output D0 of the output biastable circuit 60 remains energised after the application of the reset pulse P0 occurring when the timer output T1 is energised. The second sub-routine of the addition routine, the addition of the number in the input register 24 to the number in the accumulator register 38, follows and is described later.

The second sub-routine of the addition routine. the addition operation, begins when the output D0 of the output bistable circuit 60 remains energised after the application of the reset pulse PO occuring when the timer output T1 is energised. The gates 373, 517 and 521 control the addition of the number in the input register 24 to the number in the accumulator register 38. At the end of the addition routine the gate 723 pulses the bistable circuit 70 so that the output $\overline{D}$ is energised and the gate 689 pulses the bistable circuit 66 so that the output $\overline{C}$ is energised. The digit stage T11 of the accumulator register 38 is left in the cleared state at the end of the addition routine. If the accumulator T11 digit stage has a carry from the T10 digit stage, gate circuits (not shown) shifts by one difit the number stored in the accumulator register so that the most significant digit of the number is shifted from the T11 digit stage to the T10 digit stage.

The subtraction routine is similar to the addition routine and uses the usual method of adding the nines complement of the number in the input register 24 plus one digit to the number in the accumulator register, using the gates 518, 519 and 520 (FIG. 6). As the addition and subtraction routines are so similar, when the other function counter output F4 is energised, the one output F3 is also energised and any addition gates not required for subtraction are closed by a $\overline{F4}$ signal from the output of the invertor circuit 517*a* (FIG.6) whose input is connected to the F4 output.

At the end of the second sub-routine of the addition routine and the beginning of the copy routine, the output T11 of the timer circuit 12 and the output S11 of the slip counter 52 are energised, together with the outputs $\overline{C}$ and $\overline{D}$ of the bistable circuits 66 and 70 respectively. The gate 763 ensures that output E of the bistable circuit 74 is energised at the beginning of the copy routine and during the first timing period of the timer circuit 12. During the first timing period the gate 549 controls the transmission of one pulse to the slip counter 52 so that the gates 228, 367 and 511 are energised when the timer circuit output T10 coincides with the slip circuit output S11. The gate 228 and the gate 511 clear the T10 stage of the accumulator register 38 into the buffer 20. The gate 367 clears the T10 stage of the input register 24. At the end of the first timing period the gate 764 pulses the bistable circuit 74 so the output $\overline{E}$ is energised. During the next timing period of the timer circuit 12 the gate 229 zeros the buffer while the gates 368 and 512 control the transmission of the content of the buffer to the T10 stages of the input register 24 and the accumulator register 38 respectively. At the end of the second timing period the gate 764 pulses the bistable circuit 74 so that the output E is energised. At the beginning of the third timing period the gate 549 controls the transmission of one pulse to the slip counter 52 so that the gates 228, 367 and 511 are energised when the timer circuit output T9 coincides with the slip circuit output S11. The copy routine continues until the timer circuit output TD coincides with the slip counter output S11 so that the gate 586 adds the input register decimal point to the accumulator register decimal point while the output E of the bistable circuit 74 is energised. The gates 587 and 371 cause the accumulator decimal point to be circulated and copied into the TD stage of the input register respectively, when the output $\overline{E}$ of the bistable circuit 74 is energised. When all of the numbers have been copied, the output BO of the buffer 20 is energised at the same time as the timer circuit output T11 and the slip counter output S11, so that the gate 118 pulrses the function counter 10 so that the output F0 is energised so that the copied number is displayed on the visual display 14.

If, as a result of the subtraction operation performed immediately before the copy routine, the answer to subtraction operation is negative, the subsequent copy routine is changed to a complement copy routine. If at the end of the subtraction operation, the answer is negative, the gate 802 pulses the bistable circuit 78 so that the output H is energised. The output H causes the gates 368 and 512 to be closed and the gates 369 and 513 to be opened so that the complement of the digit in the buffer 20 is transferred or copied to the input register 24 and the accumulator register 38 respectively, when the output $\bar{E}$ of the bistable 74 is energised. Thus the complement copy routine only differs from the ordinary or non-complement copy routine by the value of the digit transferred from the buffer 20 to the input register 24 and the accumulator register 38.

If the 'clear' key on the function keyboard 8 is depressed after a number has been entered, or indexed, into the input register 24, an identical operation occurs to that previously described when the 'clear' key is depressed after switch-on. Thus the number originally entered into the input register 24 is copied into the input register 24 and the accumulator register 38.

If the 'clear' key on the function keyboard 8 is depressed after an arithmetical operation has been completed, the input register 24 is cleared and the accumulator register 38 is not cleared, since the answer to the arithmetic operation is stored in the accumulator register, before the addition and copy routines previously described are performed. At the end of the arithmetic routine the output $\bar{A}$ of the bistable circuit 62 is energised so that the answer stored in the accumulator register 38 is displayed by the visual display 14. The effect of depressing the 'clear' key causes the same sequential operation of the function counter outputs F0, F1, F2 and F3 as previously described. However, after the gate 114 pulses the function counter 10 so that the output F1 is energised, the energised output $\bar{A}$ inhibits the gates 502 and 581 to prevent the accumulator register from being cleared. The energised output $\bar{A}$ also inhibits the gate 362, which prevents the input register 24 from being cleared, so that the gate 363 controls the clearing of the input register 24. The gate 112 pulses the function counter 10 so that the output F2 is energised and the subsequent operations are identical to those previously described.

The copy routine and the complement copy routine are not limited to use with the addition and subtraction routines respectively described above. The copy routines can be arranged to be directly or indirectly initiated by any of the outputs of the function counter 10.

What is claimed is:

1. A calculating machine having a circuit system for copying the number stored in a first storage register into a second storage register for use of that number therein, each register having a plurality of respective digit stages for holding decimal number notation until transfer pulses are received, an input stage including input gates for entering decimal numbers and means recirculating the decimal number notation of each digit storage through the register in response to transfer pulses, which circuit system comprises a pulse generator for supplying trains of 10 pulses selectively into the respective input stages of the first and second register through respective ones of said input gates of such registers, output gates for the input stages of both registers having ouputs which are energized as a digit stored in each input stage becomes zero, said energizable outputs being connected by transfer control means to control said input gates at the input of the stages of the other register to direct passage of pulses of a train of 10 pulses to pass into the other register to thereby copy numbers from one register to reside in the other register, and means whereby the copying of the number is controlled by a function switch on the calculating machine which is connected to selectively enable pulses to pass from each register to the other register.

2. A calculating machine including a first register and a second register, the registers having a plurality of input stages, each input stage comprising a buffer stage including counter means providing for a count of ten and producing an output at a zero count storage means external to said registers for storing a digit, first means for entering a digit stored in said input stage of the first register into the storage means, second means for entering into said input stage of the second register the digit stored in the storage means, and control means comprising function control switch means and associated gate circuits for controlling the operation of the first entering means, the storage means and the second entering means including means to enter a digit into the storage means from said input stage of the first register and thereafter to enter the digit stored in the storage means into said input stage of the second register.

3. A calculating machine according to claim 2, wherein the calculating machine includes a first means for clearing from input stage of the first register a digit and entering the digit into the storage means by the first entering means and a second means for clearing input stage in the second register; and wherein the second entering means has means connected to transfer a digit stored in the storage means to both the cleared input stages of the first register and the second register; and gating means operating said control means to enter upon command a digit from the first register into the storage means.

4. A calculating machine according to claim 3, including timing control means comprising a master oscillator; and a number pulse circuit comprising a decade counter connected to the output of the master oscillator to divide continuously-generated oscillator pulses into a continuous sequence of trains of 10 pulses, means providing between each train of 10 pulses and the next train of 10 pulses a shift pulse for shifting decimal digits in said register, means selectively applying the shift pulse to the first register and the second register; a timer counter circuit having the same number of count stages as in the decimal number in said registers, means causing the tenth pulse of the trains of 10 pulses from the number pulse circuit decade counter to count the timer circuit; and a control circuit comprising a bistable circuit connected in one state to control the first entering means and the first and second clearing means, and in the other state to control the first entering means and the second entering means.

5. A calculating machine according to claim 4, wherein the first register and the second register input stage each comprises a shift register buffer stage connected to the register so as to form an endless loop for circulating the digits of the number stored in the register, the input gates of the shift register buffer of both registers being connected to receive the pulses from the master oscillator; and wherein the first register and the second register each include a carry store comprising a first bistable circuit with an input connected to the output of the shift register buffer.

6. A calculating machine according to claim 3, wherein the storage means includes a buffer decade counter having an output which is energized when the buffer decade counter indicates a count of a digit of predetermined value, and wherein the first entering means comprises a set of gates whose output is connected to the input of the buffer decade counter, and having an input connected to the continuously-generated pulses from the master oscillator.

* * * * *